(12) United States Patent
Coupe et al.

(10) Patent No.: US 9,080,454 B2
(45) Date of Patent: *Jul. 14, 2015

(54) COMPOSITE MATERIAL TURBINE ENGINE VANE, AND METHOD FOR MANUFACTURING SAME

(75) Inventors: Dominique Coupe, Le Haillan (FR); Clément Roussille, Bordeaux (FR); Jonathan Goering, York, ME (US); Julien Mateo, Carignan de Bordeaux (FR); Nicolas Eberling-Fux, Talence (FR); Guillaume Renon, Vaux le Pénil (FR)

(73) Assignees: SNECMA, Paris (FR); HERAKLES, Le Haillan (FR)

( * ) Notice: Subject to any disclaimer, the term of this patent is extended or adjusted under 35 U.S.C. 154(b) by 1056 days.

This patent is subject to a terminal disclaimer.

(21) Appl. No.: 13/131,285

(22) PCT Filed: Nov. 26, 2009

(86) PCT No.: PCT/FR2009/052309
§ 371 (c)(1),
(2), (4) Date: Aug. 11, 2011

(87) PCT Pub. No.: WO2010/061140
PCT Pub. Date: Jun. 3, 2010

(65) Prior Publication Data
US 2011/0311368 A1     Dec. 22, 2011

(30) Foreign Application Priority Data
Nov. 28, 2008 (FR) ..................... 08 58090

(51) Int. Cl.
*F01D 25/00* (2006.01)
*F01D 5/28* (2006.01)
(Continued)

(52) U.S. Cl.
CPC ............. *F01D 5/282* (2013.01); *B29C 70/222* (2013.01); *B29C 70/24* (2013.01); *C04B 35/571* (2013.01);
(Continued)

(58) Field of Classification Search
CPC ............. F01D 5/00; F01D 5/282; F01D 9/02; F01D 25/00
USPC ............... 29/889.71; 416/229 R, 230, 241 A, 416/241 B, 241 R
See application file for complete search history.

(56) References Cited

U.S. PATENT DOCUMENTS 5,071,679 A     12/1991  Heraud et al.
6,627,019 B2 *  9/2003   Jarmon et al. ............. 156/89.11
(Continued)

FOREIGN PATENT DOCUMENTS

EP       1 526 285        4/2005
FR       2 933 970        1/2010
WO       WO 2006/136755   12/2006

OTHER PUBLICATIONS

International Search Report as issued for PCT/FR2009/052309.
(Continued)

*Primary Examiner* — Nathaniel Wiehe
*Assistant Examiner* — Woody A Lee, Jr.
(74) *Attorney, Agent, or Firm* — Oblon, McClelland, Maier & Neustadt, L.L.P.

(57) ABSTRACT

A method of fabricating a turbomachine blade out of a composite material including fiber reinforcement densified by a matrix, the method including making a one-piece fiber blank by three-dimensional weaving; shaping the fiber blank to obtain a one-piece fiber preform having a first portion forming a blade airfoil and root preform and at least one second portion forming a preform for an inner or outer blade platform; and densifying the preform with a matrix to obtain a composite material blade having fiber reinforcement constituted by the preform and densified by the matrix, forming a single part with incorporated inner and/or outer platform.

16 Claims, 8 Drawing Sheets

(51) Int. Cl.
   *B29C 70/22* (2006.01)
   *B29C 70/24* (2006.01)
   *D03D 25/00* (2006.01)
   *C04B 35/571* (2006.01)
   *C04B 35/628* (2006.01)
   *B29L 31/08* (2006.01)

(52) U.S. Cl.
   CPC ..... *C04B 35/62868* (2013.01); *C04B 35/62873* (2013.01); *C04B 35/62884* (2013.01); *C04B 35/62894* (2013.01); *C04B 35/62897* (2013.01); *D03D 25/005* (2013.01); *B29L 2031/08* (2013.01); *C04B 2235/5244* (2013.01); *C04B 2235/5256* (2013.01); *C04B 2235/616* (2013.01); *F05D 2300/21* (2013.01); *F05D 2300/6033* (2013.01); *F05D 2300/614* (2013.01); *F05D 2300/702* (2013.01); *Y02T 50/67* (2013.01); *Y02T 50/672* (2013.01)

(56) References Cited

U.S. PATENT DOCUMENTS

| | | | | |
|---|---|---|---|---|
| 6,821,087 | B2 * | 11/2004 | Matsumoto et al. | 415/191 |
| 7,241,112 | B2 * | 7/2007 | Dambrine et al. | 415/230 |
| 8,061,391 | B2 * | 11/2011 | Dunleavy | 139/384 R |
| 8,499,450 | B2 * | 8/2013 | Naik | 29/889.71 |
| 8,696,319 | B2 * | 4/2014 | Naik | 416/230 |
| 2007/0148000 | A1 * | 6/2007 | Marusko et al. | 416/193 A |
| 2007/0248780 | A1 | 10/2007 | Schober et al. | |

OTHER PUBLICATIONS

U.S. Appl. No. 13/607,131, filed Sep. 7, 2012, Roussille, et al.
U.S. Appl. No. 13/606,935, filed Sep. 7, 2012, Roussille, et al.

* cited by examiner

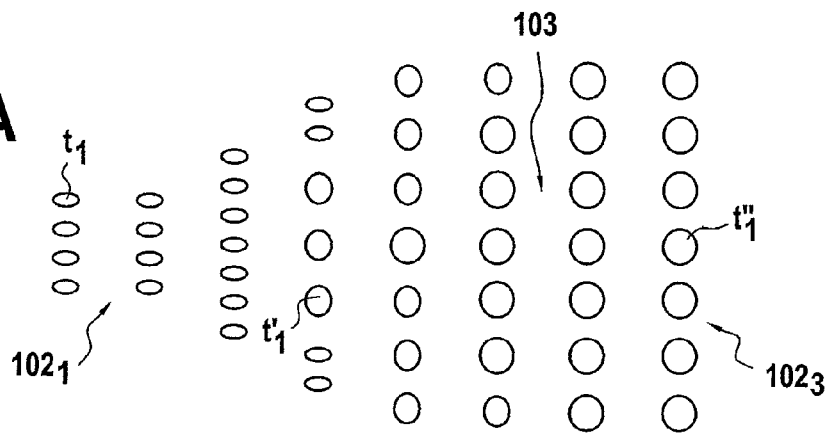
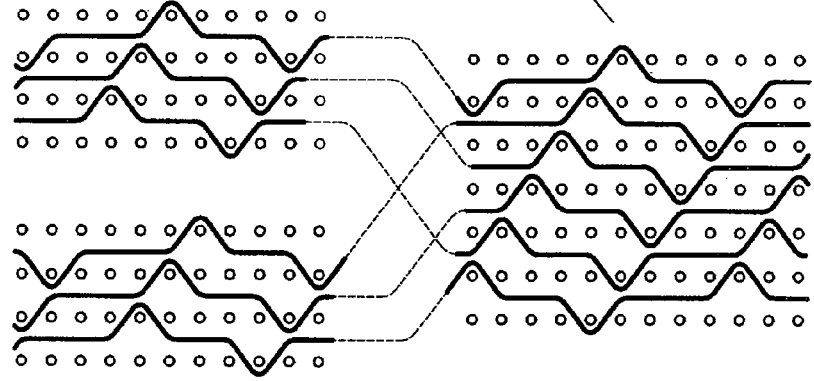
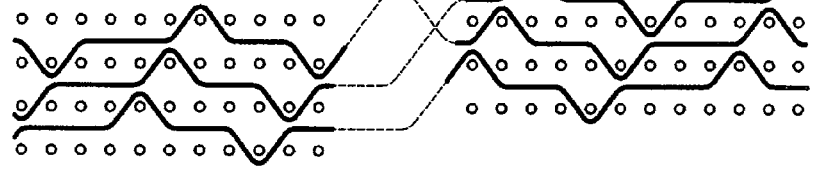
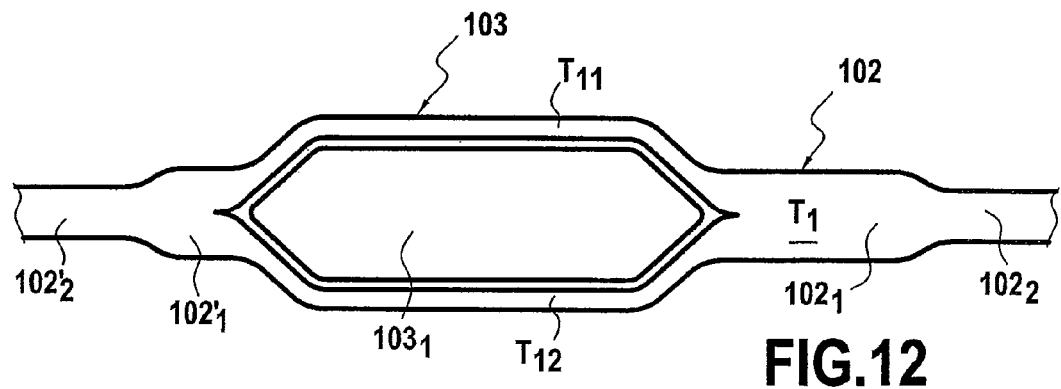

COMPOSITE MATERIAL TURBINE ENGINE VANE, AND METHOD FOR MANUFACTURING SAME

CROSS REFERENCE TO RELATED APPLICATIONS

This application is the U.S. National Stage of PCT/FR2009/052309, filed Nov. 26, 2009, which in turn claims priority to French Application No. 0858090, filed Nov. 28, 2008. The contents of both applications are incorporated herein by reference in their entirety.

BACKGROUND OF THE INVENTION

The invention relates to turbomachine blades made of composite material comprising fiber reinforcement densified by a matrix.

The intended field is that of gas turbine blades for aeroengines or industrial turbines.

Proposals have already been made to fabricate turbomachine blades out of composite material. By way of example, reference can be made to document EP 1 526 285, which describes fabricating a fan blade by making a fiber preform by three-dimensional weaving and densifying the preform with an organic matrix.

Furthermore, in order to make structural parts of a turbomachine that are exposed to high temperatures in operation, the use of thermostructural composite materials and in particular of ceramic matrix composite (CMC) material has already been proposed. Compared with metal alloys, such materials can present increased ability to withstand high temperatures and smaller weight. In particular for the gas turbines of aeroengines, it is desirable both to reduce weight and also to reduce polluting emissions by increasing temperature.

OBJECT AND SUMMARY OF THE INVENTION

It is therefore desirable to have available turbomachine blades that are made of composite material, particularly, but not necessarily, made of a thermostructural composite material such as CMC, for use in turbomachine turbines or compressors, which blades need to present the required mechanical properties while also presenting shapes that are relatively complex.

To this end, the present invention provides a method of fabricating a turbomachine blade out of a composite material comprising fiber reinforcement densified by a matrix, the method comprising:
  making a one-piece fiber blank by three-dimensional weaving;
  shaping the fiber blank to obtain a one-piece fiber preform having a first portion forming a blade airfoil and root preform and at least one second portion forming a preform for an inner or outer blade platform; and
  densifying the preform with a matrix to obtain a composite material blade having fiber reinforcement constituted by the preform and densified by the matrix, forming a single part with incorporated inner and/or outer platform.

By making the fiber reinforcement of the blade from a blank obtained as a single part by three-dimensional weaving, it is possible to ensure at least partial mutual interlacing between the portions of the fiber reinforcement that correspond to the portion of the blade forming airfoil and root and to the or each portion forming inner or outer platform.

This contributes to conferring the required mechanical properties to a blade having an incorporated inner and/or outer platform, in particular at the connection between the portion forming the airfoil and the root and the or each portion forming an inner or outer platform.

According to an advantageous feature of the method, in the longitudinal direction of the fiber blank that corresponds to the longitudinal direction of the blade that is to be made, the fiber blank comprises a first set of a plurality of layers of yarns that are linked together to form a first portion of the blank that corresponds to the preform for the blade airfoil and root, and a second set of a plurality of layers of yarns that are linked together at least locally to form at least one second portion of the blank that corresponds to a preform for an inner or outer blade platform, the yarns of the first set of layers of yarns are not linked to the yarns of the second set of layers of yarns, and yarns of the second set of layers of yarns cross through the first set of layers of yarns at the level of the location of the or each second portion of the blank.

The arrangement of non-linked zones enables the fiber preform to be shaped without cutting linking yarns, where such cutting could reduce the mechanical strength of the fiber reinforcement and thus of the resulting blade.

According to another feature of the method, the fiber blank is woven with a second continuous set of layers of yarns and the shaping of the fiber blank comprises eliminating portions of the second set of layers of yarns external to the or each second portion of the fiber blank by cutting them away.

According to yet another feature of the method, at the location or at least at one of the locations where yarns of the second set of layers of yarns cross through the first set of layers of yarns, the intersection between a layer of yarns of the first set and a layer of yarns of the second set follows a line that is not orthogonal to the longitudinal direction of the fiber blank. It is thus possible to fabricate a blade out of composite material having an inner and/or outer platform that extends generally non-perpendicularly to the longitudinal direction of the blade.

According to yet another feature of the method, in the first portion of the fiber blank and in a direction that corresponds to the direction extending along the profile of an airfoil of varying thickness in the blade that is to be made, the number of layers of yarns in the first set of layers of yarns is constant. The yarns of the first set of yarns may then be of varying weights and/or counts.

Advantageously, a strip comprising a succession of fiber blanks is made by three-dimensional weaving. These blanks may subsequently be cut out from the strip. The blanks may be woven with the longitudinal direction of the blade that is to be made extending in the weft direction or in the warp direction.

The present invention also provides a turbomachine blade made of composite material comprising fiber reinforcement obtained by three-dimensional weaving of yarns and densified by a matrix, which blade comprises a first portion constituting the blade airfoil and root formed as a single part together with at least one second portion constituting an inner or outer blade platform, and the two portions of the fiber reinforcement that corresponds to the first and second portions of the blade are mutually interlaced at least in part, with yarns of one of the portions of the fiber reinforcement penetrating into the other one portion of the fiber reinforcement.

The blade may be made of a ceramic matrix composite material.

According to a feature of the blade, yarns constitutive of the portion of the fiber reinforcement that corresponds to the second portion of the blade cross through the portion of the fiber reinforcement that corresponds to the first portion of the blade.

The airfoil of the blade may have a profile of varying thickness, along which the portion of the fiber reinforcement that corresponds to the first portion of the blade has, in the longitudinal direction of the blade, a constant number of layers of yarns having varying weights and/or counts, or a varying number of layers of yarns.

The invention also provides a turbomachine fitted with a blade as defined above.

BRIEF DESCRIPTION OF THE DRAWINGS

The invention can be better understood from the following description given by way of non-limiting indication with reference to the accompanying drawings, in which:

FIG. 11A is a weft section view showing one example of an arrangement of weft yarns in a portion of the fiber blank that corresponds to a portion of the blade root;

FIGS. 11B to 11D are weft section views showing warp planes for an example of (multilayer) three-dimensional weaving in the FIG. 11A fiber blank portion;

FIG. 12 is a diagrammatic fragmentary section view showing another embodiment of a blank portion that corresponds to a blade root;

DETAILED DESCRIPTION OF EMBODIMENTS

Figure 1:
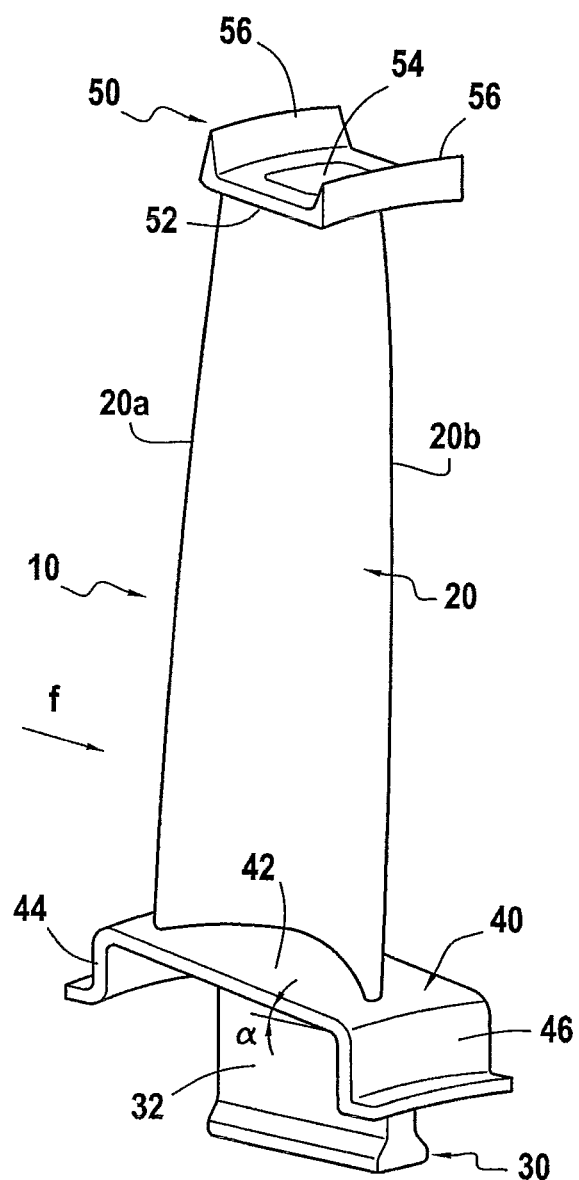
FIG. 1 is a perspective view of a turbomachine blade with incorporated outer and inner platforms.

The invention is applicable to various types of turbomachine blades with incorporated inner and/or outer platforms, in particular compressor and turbine blades for various gas turbine spools, e.g. a blade for a rotor wheel of a low-pressure (LP) turbine, as shown in FIG. 1.

The blade 10 in FIG. 1 comprises in well-known manner an airfoil 20, a root 30 constituted by a portion of greater thickness, e.g. being a bulb-shaped section extended by a tang 32, an inner platform 40 situated between the tang 32 and the airfoil 20, and an outer platform 50 in the vicinity of the free end of the blade.

The airfoil 20 extends in a longitudinal direction between the inner and outer platforms 40 and 50 and in cross-section it presents a curved profile of thickness that varies between its leading edge 20a and its trailing edge 20b.

The blade 10 is mounted on a turbine rotor (not shown) by engaging its root 30 in a housing of corresponding shape formed in the periphery of the rotor. The root 30 is extended by the tang 32 so as to join the inside (or bottom) face of the inner platform 40.

At its radially inner end, the airfoil 20 is connected to the outer (or top) face 42 of the inner platform 40, which face defines the inside of the flow passage for the gas stream thorough the turbine. In its upstream and downstream end portions (relative to the flow direction f of the gas stream), the inner platform is terminated by rims 44 and 46. In the example shown, the face 42 of the inner platform is inclined, generally forming a non-zero angle α relative to the normal to the longitudinal direction of the blade. Depending on the profile desired for the inside surface of the flow passage for the gas stream, the angle α may be zero, or the face 42 could have a profile that is generally not rectilinear, e.g. a curved profile.

At its radially outer end, the airfoil joins the outer platform 50 via an inner (bottom) face 52 thereof that serves to define the outside of the flow passage for the gas stream. On its outside (top), the outer platform defines a depression or bathtub 54. Along the upstream and downstream edges of the bathtub 54, the outer platform carries wipers 56 of tooth-shaped profile, and the tips of the wipers can penetrate into a layer of abradable material in a turbine ring (not shown) so as to reduce the clearance between the tips of the blade and the turbine ring. In the example shown, the face 52 of the outer platform extends substantially perpendicularly to the longitudinal direction of the blade. In a variant, depending on the profile desired for the outer surface of the flow passage for the gas stream, the face 52 could be inclined, generally forming a non-zero angle relative to the normal to the longitudinal direction of the blade, or the face 52 could have a profile that is generally not rectilinear, e.g. a curved profile.

Figure 2:
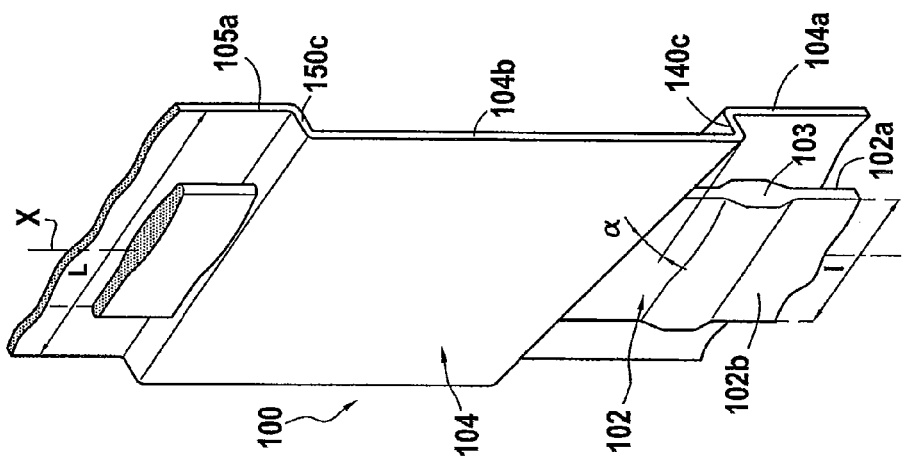
FIG. 2 is a highly diagrammatic representation of the disposition of two sets of layers of yarns in a three-dimensional woven fiber blank for use in making a fiber preform for a blade of the kind shown in FIG. 1.

FIG. 2 is a highly diagrammatic view of a fiber blank 100 from which a blade fiber preform can be formed such that, after it has been densified by a matrix and possibly also machined, a blade is obtained that is made of composite material with incorporated inner and outer platforms, of the kind shown in FIG. 1.

The blank 100 comprises two portions 102 and 104 obtained by three-dimensional weaving or multilayer weaving, and only the envelopes of these two portions are shown in FIG. 2. After being shaped, the portion 102 is to constitute a portion of the blade fiber preform that corresponds to a preform for the airfoil and the root of the blade. After being shaped, the portion 104 is to constitute the portions of the blade fiber preform that correspond to preforms for the inner and outer platforms of the blade.

The two portions 102 and 104 are in the form of strips extending generally in a direction X that corresponds to the longitudinal direction of the blade that is to be made. In its portion that is to form an airfoil preform, the fiber strip 102 presents varying thickness that is determined as a function of the thickness of the profile of the airfoil of the blade that is to be made. In its portion that is to form a root preform, the fiber strip 102 presents extra thickness 103 that is determined as a function of the thickness of the root of the blade that is to be made.

The fiber strip 102 has a width l selected as a function of the developed (flat) profile of the airfoil and the root of the blade that is to be made, while the fiber strip 104 has a width L greater than l and selected as a function of the developed lengths of the inner and outer platforms of the blade that is to be made.

The fiber strip 104 is of substantially constant thickness determined as a function of the thickness of the platforms of the blade that is to be made. The strip 104 has a first portion 104a extending along and beside a first face 102a of the strip 102, a second portion 104b extending along and beside the second face 102b of the strip 102, and a third portion 105a extending along and beside the first face 102a of the strip 102.

The portions 104a and 104b are connected together by a connection portion 140c that extends transversely relative to the strip 102 at a location that corresponds to the location of the inner platform of the blade that is to be made. The connection portion 140c crosses the strip, forming an angle α relative to the normal to the longitudinal direction of the fiber blank. The portions 104b and 105a are connected together by a connection portion 150c that extends transversely relative to the strip 102 at a location that corresponds to the location of the outer platform of the blade that is to be made. In the example shown, the connection portion 150c crosses the strip 102 substantially perpendicularly to the longitudinal direction X of the fiber blank. Depending on the shape desired for the outer platform of the blade, the connection portion 150c could cross the strip 102 forming a non-zero angle relative to the normal to the longitudinal direction X of the blade, like the inner platform. In addition, the profile of the connection portion 140c and/or the profile of the connection portion 150c could be curvilinear instead of being rectilinear as in the example shown.

As described below in greater detail, the strips 102 and 104 are woven simultaneously by three-dimensional weaving, without any linking between the strip 102 and the portions 104a, 104b, and 105a of the strip 104, with a plurality of successive blanks 100 being woven continuously in the direction X.

Figure 5:
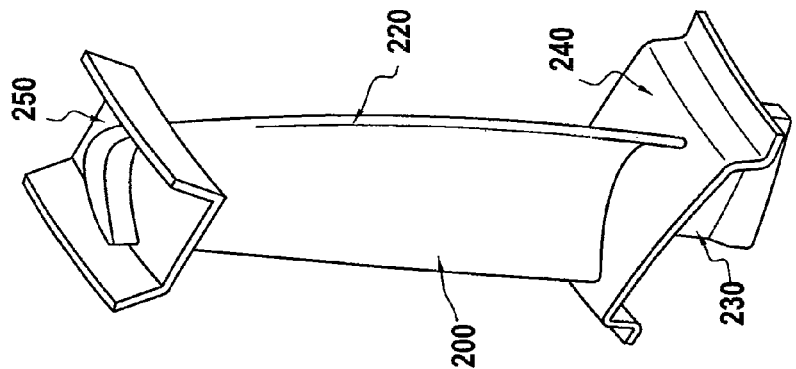
FIGS. 3, 4, and 5 show successive steps in making a fiber preform for a blade as shown in FIG. 1, starting from the fiber blank of FIG. 2.
Figure 4:
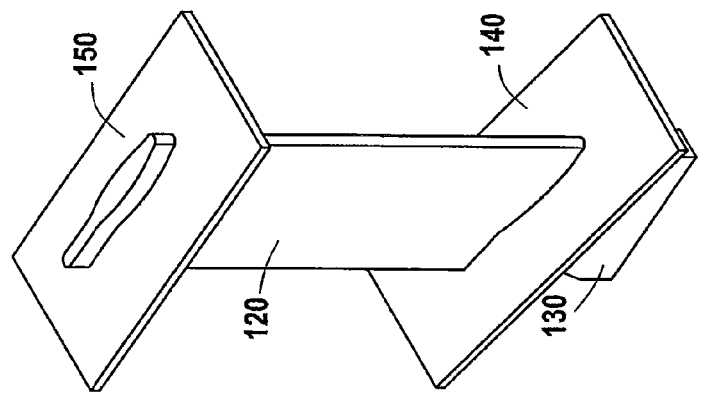
Figure 3:
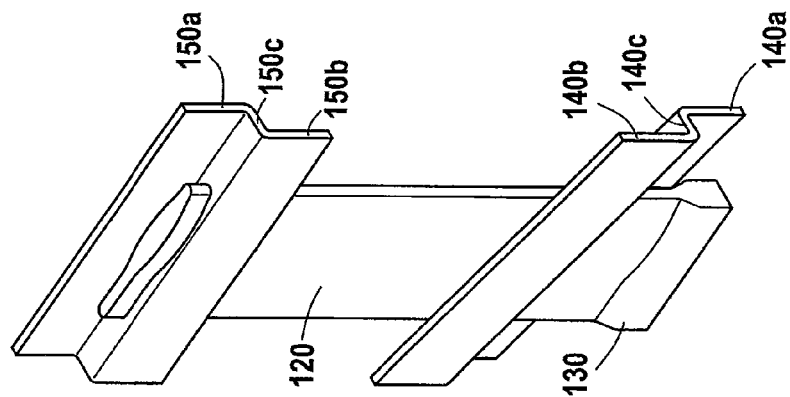

FIGS. 3 to 5 show highly diagrammatically how a fiber preform of shape close to that of the blade that is to be made can be obtained from the fiber blank 100.

The fiber strip 102 is cut at one end in the extra thickness 103 and at another end a little beyond the connection portion 150c so as to have a strip 120 of length that corresponds to the longitudinal direction of the blade that is to be made, with an enlarged portion 130 formed by a portion of the extra thickness 103 and situated at a location that corresponds to the position of the root of the blade that is to be made.

In addition, cuts are formed in the ends of the portions 104a and 105a of the strip 104 and in its portion 104b so as to leave segments 140a and 140b on either side of the connection portion 140c and segments 150a and 150b on either side of the connection portion 150c, as shown in FIG. 3. The lengths of the segments 140a & 140b and 150a & 150b are determined as a function of the lengths of the platforms of the blade that is to be made.

Because there is no linking between the strip 102 of the fiber blank and the portions 104a, 104b, and 105a, the segments 140a, 140b, 150a, and 150b can be folded out perpendicularly to the strip 102 without cutting yarns so as to form plates 140, 150, as shown in FIG. 4.

A fiber preform 200 for the blade that is to be made is subsequently obtained by molding, with the strip 102 being deformed so as to reproduce the curved profile of the blade airfoil and with the plates 140 and 150 being deformed so as to reproduce shapes similar to those of the inner and outer platforms of the blade, as shown in FIG. 5. A preform is thus obtained having an airfoil preform portion 220, a root preform portion 230 (including a tang preform), and platform preform portions 240 and 250.

As described below, the steps of making a blade preform from a fiber blank are advantageously performed after the fibers of the blank have been treated and impregnated with a consolidation composition.

A method of three-dimensionally weaving the fiber blank 100 is described below in detail.

It is assumed that the weaving is performed with warp yarns extending in the longitudinal direction X of the blank, it being specified that it is also possible to perform weaving with the weft yarns extending in this direction.

Variation in the thickness of the strip 102 along its length is obtained by using weft yarns of varying weight. In a variant, or in addition, it is possible to vary the count of the warp yarns (number of yarns per unit length in the weft direction), a smaller count making greater thinning possible when shaping the preform by molding.

Figure 6:
FIG. 6 is a section view showing the profile laid out flat of a blade airfoil such as that of FIG. 1.
Figure 7:
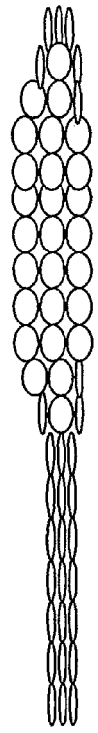
FIG. 7 is a section view through a set of layers of warp yarns suitable for obtaining a profile as shown in FIG. 6.

Thus, to obtain a blade airfoil profile as shown in flat projection in FIG. 6, it is possible to use three layers of warp yarns of varying weights and counts as shown in FIG. 7.

In an embodiment, the yarns used may be silicon carbide (SiC) yarns supplied under the name "Nicalon" by the Japanese supplier Nippon Carbon having a weight (expressed as a number of filaments) of 0.5K (i.e. 500 filaments).

The warp is made up using 0.5K SiC yarns and 1K SiC yarns obtained by uniting two 0.5K yarns, the two yarns being united by covering. The covering is advantageously implemented using a yarn of temporary nature suitable for being eliminated after weaving, e.g. a yarn of polyvinyl alcohol (PVA) that can be eliminated by being dissolved in water.

Table I below specifies for each column of warp yarns the count (number of yarns per centimeter in the length of the profile), the number of 0.5K yarns, the number of 1K yarns, and the thickness of the profile in millimeters (mm), where said thickness varies over the range about 1 mm to 2.5 mm:

TABLE I

| Column | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Count | 6 | 6 | 6 | 6 | 6 | 6 | 6 | 8 | 8 | 8 | 8 | 8 | 8 | 8 | 8 | 8 | 8 | 8 | 6 |
| # 0.5K yarns | 3 | 3 | 3 | 3 | 3 | 3 | 3 | 2 | 1 | 0 | 0 | 0 | 0 | 0 | 0 | 0 | 2 | 1 | 3 |
| # 2 × 0.5K yarns | 0 | 0 | 0 | 0 | 0 | 0 | 1 | 2 | 3 | 3 | 3 | 3 | 3 | 3 | 3 | 1 | 2 | 0 |
| Thickness | 1 | 1 | 1 | 1 | 1 | 1 | 1.2 | 1.5 | 2 | 2.2 | 2.4 | 2.5 | 2.4 | 2.4 | 2.2 | 2.1 | 1.8 | 1.5 | 1.2 |

Naturally, depending on the available yarn weights, different combinations of numbers of layers of yarns and variations in count and in weight could be adopted for the profile that is to be obtained.

Figure 8A:
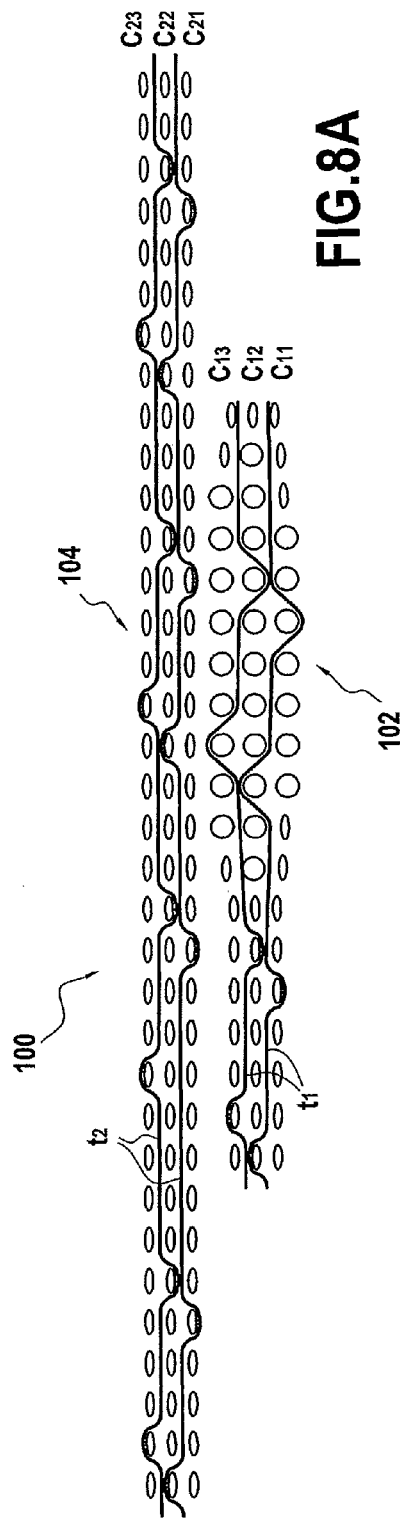
FIGS. 8A and 8B are warp section views showing one way of weaving the fiber blank of FIG. 2.
Figure 8B:
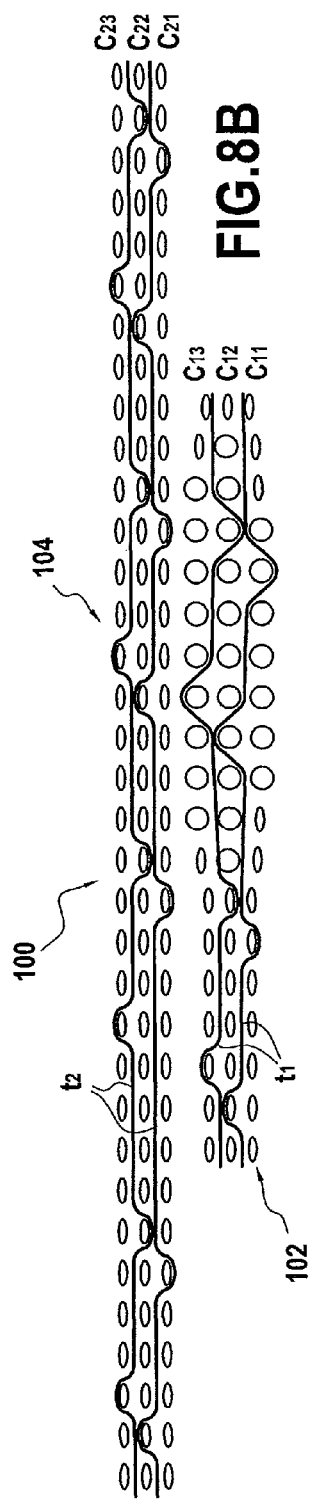

FIGS. 8A and 8B in warp section show two successive planes of a weave that can be used for weaving the fiber blank 100 outside the extra thickness 103.

The strip 102 of the fiber blank 100 comprises a set of warp yarn layers, with the number of layers in this example being equal to three (layers $C_{11}$, $C_{12}$, $C_{13}$). The warp yarns are linked together by weft yarns $t_1$ using three-dimensional weaving.

The strip 104 also has a set of warp yarn layers, e.g. likewise three layers (layers $C_{21}$, $C_{22}$, $C_{23}$) that are linked together by weft yarns $t_2$ by three-dimensional weaving, like the strip 102.

It should be observed that the weft yarns $t_1$ do not extend into the warp yarn layers of the strip 104 and that the weft yarns $t_2$ do not extend into the warp yarn layers of the strip 102 so as to ensure that they are not linked together.

In the example shown, the weaving is multilayer weaving using a satin or multi-satin type weave. Other types of three-dimensional weaving could be used, for example multilayer weaving with a multiple plain weave or weaving with an interlock weave. The term "interlock weave" is used herein to mean a weave in which each layer of weft yarns links together a plurality of layers of warp yarns, with all of the yarns in a given weft column having the same path in the plane of the weave.

Various forms of three-dimensional weaving are described in particular in document WO 2006/136755, the content of which is incorporated herein by reference.

Figure 9:
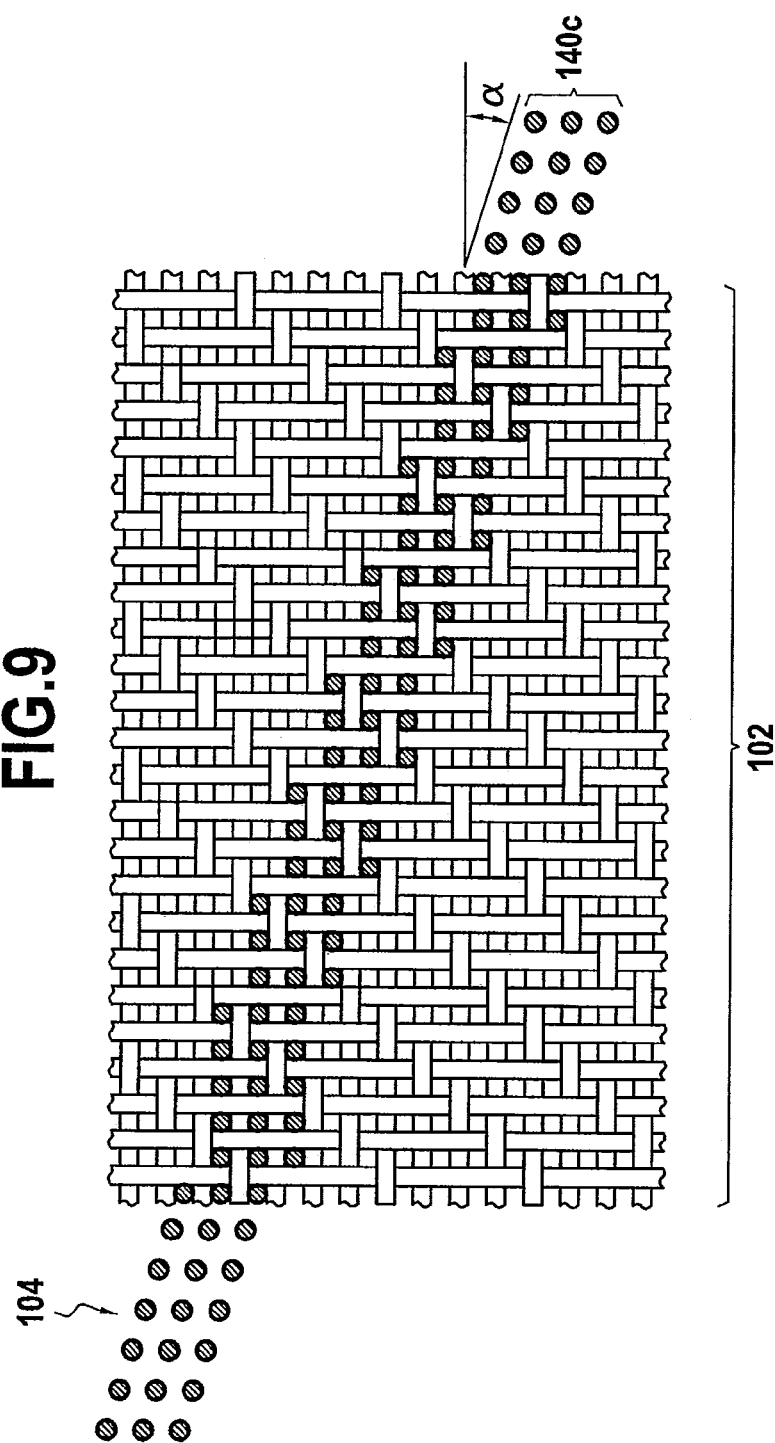
FIG. 9 is a fragmentary section view in a plane parallel to the warp and weft directions in a portion of the FIG. 2 fiber blank that corresponds to the location of the junction between the blade and its inner platform.

FIG. 9 is a section view parallel to the warp and weft directions where the strip 102 has the connection portion 140c of the strip 104 passing through, the warp yarns of the connection portion being shown in section. Each layer of warp yarns in this connection portion 140c extends in a direction making an angle α relative to the weft direction of the strip 102. During weaving, the strip 104 is caused to pass from one side to the other of the strip 102 by causing each warp yarn of the strip 104 to pass individually through the set of warp and weft yarns of the strip 102.

Figure 10:
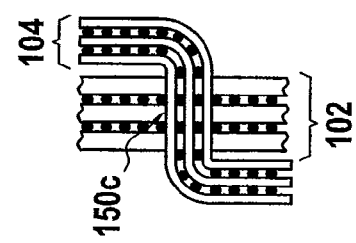
FIG. 10 is a fragmentary weft section view in a portion of the FIG. 2 fiber blank that corresponds to the location of the junction between the blade and its outer platform.

FIG. 10 is a weft section view where the connection portion 150c of the strip 104 passes through the strip 102. In the example, and as specified above, the connection portion 150c extends perpendicularly to the warp direction of the strip 102. Nevertheless, as for the connection portion 140c, it is possible to have a connection portion 150c that extends at a non-zero angle relative to the normal to the warp direction, depending on the orientation desired for the outer platform.

The extra thickness 103 may be obtained by using weft yarns of greater weight and by using additional layers of weft yarns, as shown by way of example in FIG. 11A.

In FIG. 11A, the number of layers of weft yarns passes in this example from four to seven between a portion $102_1$ of the strip 102 that corresponds to the tang of the blade and a portion $102_3$ of the strip that presents the extra thickness 103.

In addition, weft yarns $t_1$, $t'_1$, and $t''_1$ of different weights are used, the yarns $t_1$ being, for example, "Nicalon" SiC yarns having a weight of 0.5K (500 filaments), the yarns $t'_1$ being obtained by uniting two 0.5K yarns, and the yarns $t''_1$ by uniting three 0.5K yarns.

Weaving in the blank portion $102_3$ requires a greater number of layers of warp yarns than in the portion $102_1$. Advantageously, this is achieved in the transition between the portion $102_1$ and the portion $102_3$ by reducing the number of warp planes by constituting each warp plane in the portion $102_3$ by uniting warp yarns from two warp planes of the portion $102_1$. FIGS. 11B and 11C show two adjacent warp planes in the portion $102_1$, and FIG. 11D shows a warp plane obtained in the portion $102_3$ by uniting the warp planes of FIGS. 11B and 11C. In FIGS. 11B, 11C, and 11D, the different weights of the warp yarns are not shown (in the manner of FIG. 7) nor are the weights of the weft yarns (in the manner of FIG. 11A) in order to simplify the figure. Between FIGS. 11B & 11C and FIG. 11D, dashed lines show how the warp yarns of the various layers of FIGS. 11B and 11C form the warp yarn layers of FIG. 11D.

Naturally, other combinations of numbers of weft layers and weft yarn weights could be adopted to form the extra thickness 103.

In another embodiment shown diagrammatically in FIG. 12, the extra thickness 103 can be obtained by introducing an insert while weaving the strip 102.

In FIG. 12, the set $T_1$ of weft yarn layers in the portion $102_1$ of the strip 102 that corresponds to the tang of the blade is split by unlinking during weaving to form two subassemblies $T_{11}$ and $T_{12}$, and an insert $103_1$ is inserted between them. In the example shown, the portion $102_1$ is thicker than the portion $102_2$ of the strip 102 that corresponds to the blade airfoil. The transition between the portion $102_2$ and the portion $102_1$ may be achieved in the same manner as described above for the transition between the portions $102_1$ and $102_3$ in FIG. 11A. The location where the sheet 104 passes through the sheet 102 at the level of the connection portion 140c of FIG. 2 may possibly be through the thicker portion $102_1$.

At the end of the insert 103 remote from the portion $102_1$, the subassemblies $T_{11}$ and $T_{12}$ of weft yarn layers are reunited by weaving to form a portion $102'_1$ having the same thickness as the portion $102_1$, and then by a reduction in thickness a portion $102'_2$ having the same thickness as the portion $102_2$, the portion $102'_2$ forming the portion that corresponds to a blade airfoil for the following woven blank.

The insert $103_1$ is preferably a single piece of ceramic, preferably made using the same ceramic material as is used for the matrix of the composite material of the blade that is to be made. Thus, the insert $103_1$ may be an SiC block obtained by sintering SiC powder.

Figure 13:
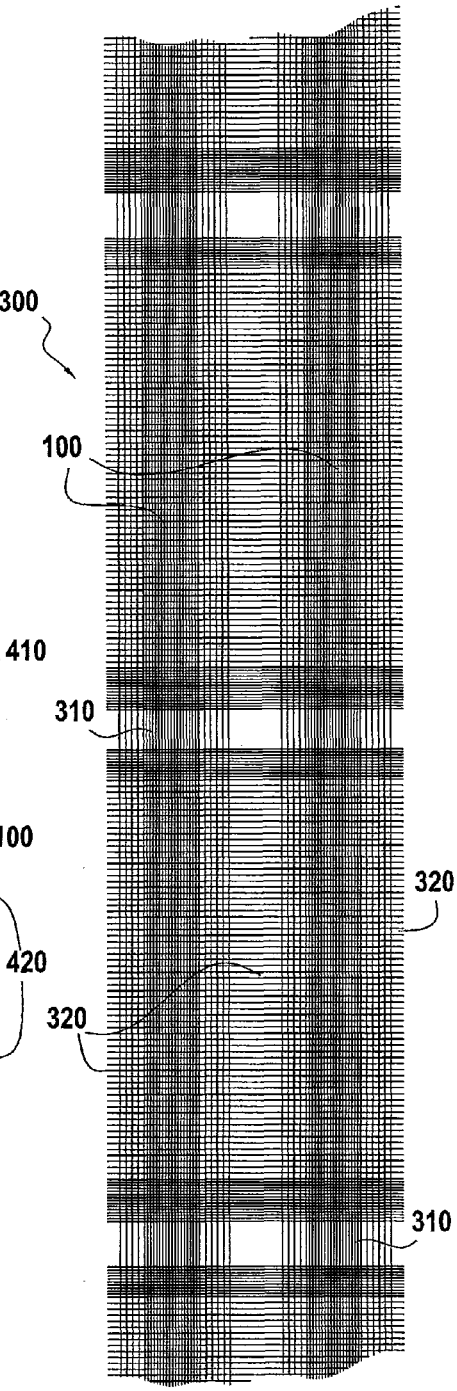

As shown very diagrammatically in FIG. 13, a plurality of fiber blanks 100 may be obtained by weaving a strip 300 having one or more rows of successive fiber blanks formed therein. Extra length zones 310, 320 are formed in the warp direction (having warp yarns only) and in the weft direction (having weft yarns only) to avoid edge phenomena associated with weaving, leaving greater freedom in deformation when the preform is shaped, and providing transition zones between the blanks 100.

Figure 14:
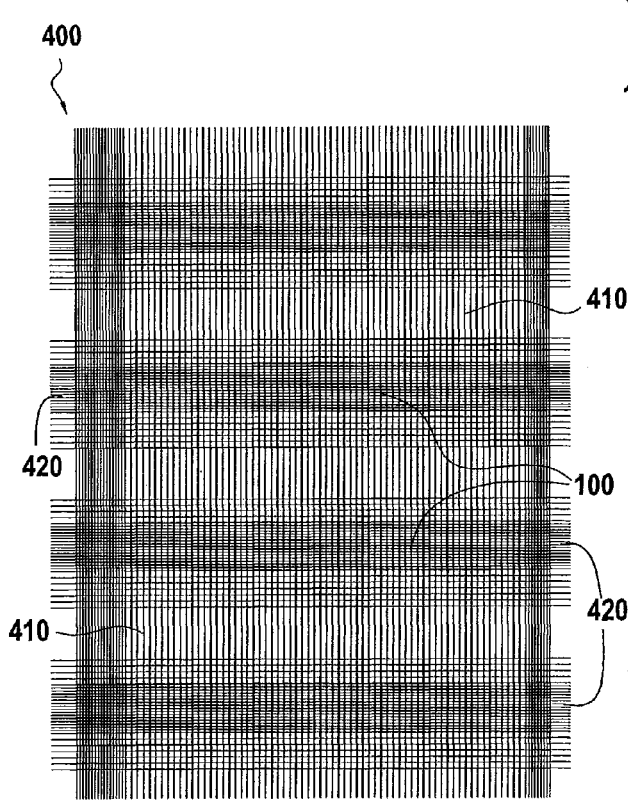
FIGS. 13 and 14 are highly diagrammatic representations of ways of making a woven fiber strip by three-dimensional weaving and comprising a fiber blank of the kind shown in FIG. 2.

FIG. 14 shows a variant embodiment in which a strip 400 is made with a row of blanks 100 woven in the weft direction perpendicularly to the longitudinal direction of the strip. Extra length zones 410, 420 are likewise formed in the warp direction and in the weft direction. A plurality of rows of blanks 100 may be woven, with the width of the strip 400 being adapted for this purpose.

Figure 15:
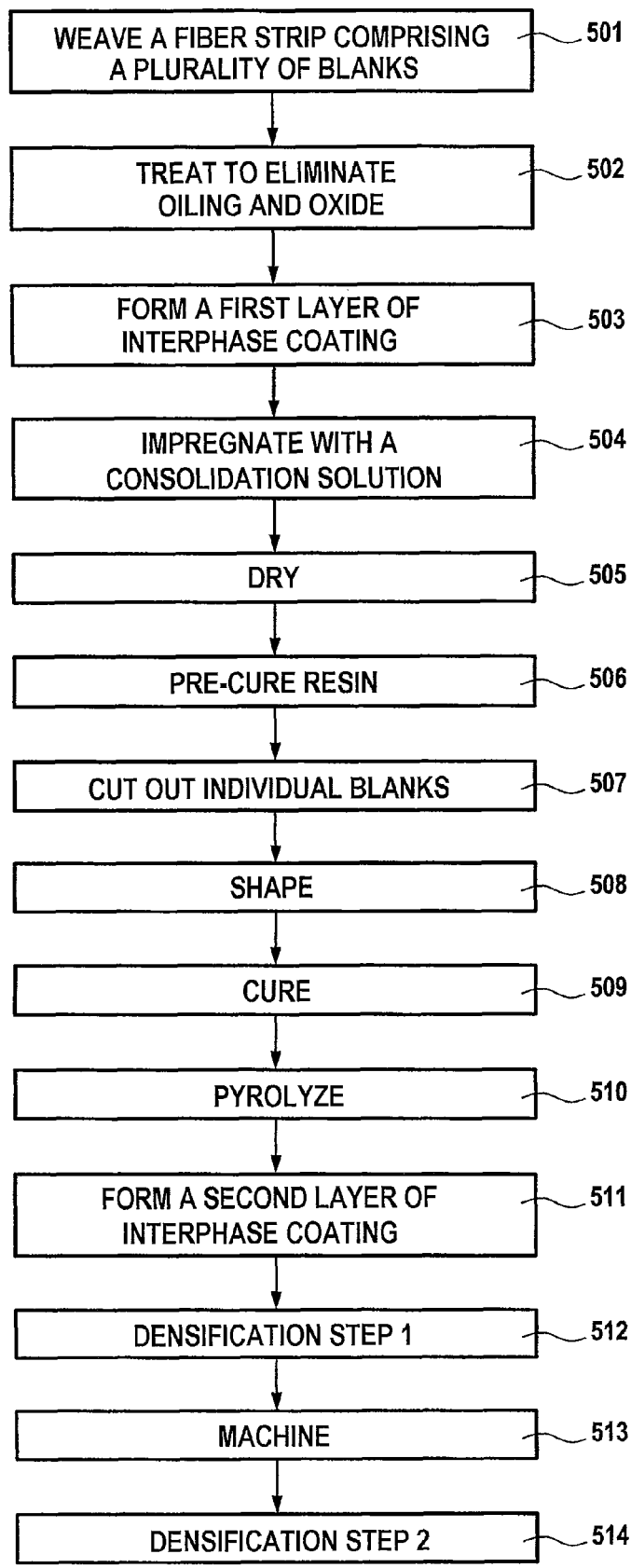
FIG. 15 shows successive steps in an implementation of a method of making a turbomachine blade in accordance with the invention.

Successive steps in a method of fabricating a blade of composite material in an implementation of the invention are given in FIG. 15.

In step 501, a fiber strip is woven by three-dimensional weaving, the strip comprising a plurality of fiber blanks, e.g. a plurality of rows of fiber blanks extending in the warp direction, as shown in FIG. 13. For turbomachine blades that are to be used at high temperature, and in particular in a corrosive environment (in particular a wet environment), the weaving is performed using yarns made of ceramic fibers, in particular silicon carbide (SiC) fibers.

In step 502, the fiber strip is treated to eliminate the oiling present on the fibers and to eliminate the presence of oxide from the surfaces of the fibers. Oxide elimination is achieved by acid treatment, in particular by immersion in a bath of hydrofluoric acid. If the oiling is not suitable for being eliminated by the acid treatment, a prior treatment for eliminating the oiling is performed, e.g. by decomposing it by brief heat treatment.

In step 503, a thin layer of interphase coating is formed on the fibers of the fiber strip by chemical vapor infiltration (CVI). The interphase coating material is constituted for example by pyrolytic carbon (PyC), by boron nitride (BN), or by boron-doped carbon (BC, e.g. having 5 atom percent (at. %) to 20 at. % of B, the balance being C). The thin layer of interphase coating is preferably of small thickness, e.g. no more than 100 nanometers (nm), or better no more than 50 nm, so as to ensure the fiber blank conserves good capacity for deformation. The thickness is preferably not less than 10 nm.

In step 504, the fiber strip with the fibers coated in a thin layer of interphase coating is impregnated with a consolidation composition, typically a resin that might optionally be dissolved in a solvent. A carbon precursor resin may be used, e.g. a phenolic resin or a furanic resin, or a ceramic precursor resin could be used, e.g. a polysilazane resin or a polysiloxane resin constituting a precursor for SiC.

After drying by elimination of the solvent, if any, from the resin (step 505), the resin may be pre-cured (step 506). Pre-curing, i.e. incomplete cross-linking, serves to increase stiffness and thus strength, while preserving capacity for deformation as is required for making blade preforms.

In step 507, the individual fiber blanks are cut out, as shown in FIG. 3.

In step 508, a fiber blank as cut out in this way is shaped (as shown in FIGS. 4 and 5) and placed in a mold, e.g. a graphite mold, for shaping the airfoil and root preform portion and for shaping the inner or outer platform preform portions.

Thereafter, the curing of the resin is completed (step 509) and the cured resin is pyrolyzed (step 510). Curing and pyrolyzing can follow one another by progressively raising the temperature in the mold.

After pyrolysis, a fiber preform is obtained that has been consolidated by the residue of the pyrolysis. The quantity of consolidation resin is selected so that the pyrolysis residue bonds the fibers of the preform together sufficiently to enable the preform to be handled while conserving its shape and without assistance from tooling, it being observed that the quantity of consolidation resin is preferably selected to be as small as possible.

Steps for eliminating oiling, for acid treatment, and for forming an interphase coating for an SiC fiber substrate are known. Reference can be made to document U.S. Pat. No. 5,071,679.

A second interphase layer is formed by CVI (step 511) so as to obtain overall a fiber-matrix interphase presenting thickness that is sufficient for it to perform its function of making the composite material non-brittle. The second interphase layer may be of a material selected from PyC, BN, and BC, and need not necessarily be the same material as that of the first interphase layer. The thickness of the second interphase layer is preferably not less than 100 nm.

It is preferable to make an interphase out of two layers, as described above. This is described in the French patent application filed under the No. 08/54937 by the Applicant.

Thereafter the consolidated preform is densified with a matrix. For a turbomachine blade that is to be used at high temperature, and in particular in a corrosive medium, the matrix is a ceramic matrix, e.g. made of SiC. It is possible to perform densification by CVI, in which case forming the second interphase layer and densifying with the matrix may follow one another in the same oven.

Densification may be performed in two successive steps (steps 512 and 514) that are separated by a step 513 of machining the blade to the desired dimensions.

It should be observed that a pre-machining may be performed between steps 509 and 510, i.e. after curing and before pyrolyzing the resin.

Figure 16:
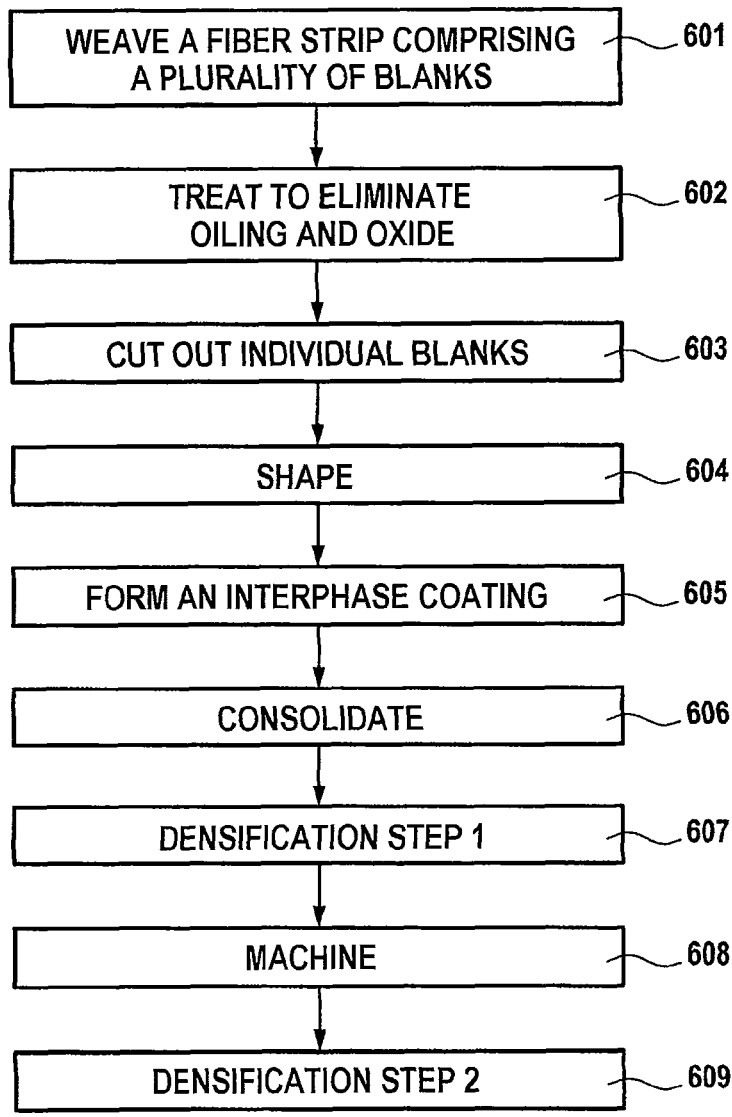
FIG. 16 shows successive steps in another implementation of a method of making a turbomachine blade in accordance with the invention.

Successive steps of a method of fabricating a blade of composite material in another implementation of the invention are given in FIG. 16.

The step 601 of three-dimensionally weaving a fiber strip comprising a plurality of fiber blanks, and the step 602 of treatment to eliminate oiling and oxide are similar to steps 501 and 502 of the implementation of FIG. 15.

In step 603, individual fiber blanks are cut out from the fiber strip, and then each individual fiber blank is shaped in a mold or jig (step 604) to obtain a blade fiber preform by shaping the airfoil and root preform portion and by shaping the platform preform portions.

In step 605, an interphase coating for making the material non-brittle is formed by CVI on the fibers of the preform while held in the jig. By way of example the interphase coating material is PyC, BN, or BC, as mentioned above. The thickness of the interphase coating is about one hundred to a few hundreds of nanometers.

With the preform still held in the jig, it is consolidated by partial densification (step 606), the consolidation being performed by forming a deposit of ceramic on the fibers by CVI.

The formation of the interphase coating by CVI and the consolidation by ceramic deposition by CVI can follow on one from the other in the same CVI oven.

The jig is preferably made of graphite and presents holes for facilitating the passage of reaction gases that provide the interphase deposit and the ceramic deposit by CVI.

Once consolidation is sufficient for the preform to be handled while conserving its shape and without assistance from support tooling, the consolidated preform is extracted from the jig and it is densified with a ceramic matrix by CVI. Densification may be performed in two successive steps (steps 607 and 609) separated by a step 608 of machining the blade to the desired dimensions.

In the description above, an airfoil profile of varying thickness is obtained by using yarns of varying weight and/or count. In a variant, it is possible to make the portion of the fiber blank that corresponds to the airfoil portion of the preform with a certain number of layers of same-weight yarns and with an unvarying count, the thickness of the profile being varied during machining after the first densification step or during pre-machining of the consolidated blank preform.

Furthermore, depending on the intended conditions of use for the blade, the fibers of the fiber reinforcement of the blade may be made of a material other than a ceramic, e.g. they may be made of carbon, and the matrix may be made of a material other than a ceramic, e.g. of carbon or of resin, the invention naturally also being applicable to fabricating blades out of a composite material having an organic matrix.

The invention claimed is:

1. A method of fabricating a turbomachine blade out of a composite material comprising fiber reinforcement densified by a matrix, the method comprising:
    making a one-piece fiber blank by three-dimensional weaving;
    shaping the fiber blank to obtain a one-piece fiber preform having a first portion forming a blade airfoil and root preform and at least one second portion forming a preform for an inner or outer blade platform; and
    densifying the preform with a matrix to obtain a composite material blade having fiber reinforcement constituted by the preform and densified by the matrix, forming a single part with incorporated inner and/or outer platform, wherein the one-piece fiber blank is woven to comprise a first part which is to constitute, after shaping, the first portion of the fiber preform and a second part which is to constitute, after shaping, the second portion of the fiber preform, and wherein, in the longitudinal direction of the fiber blank that corresponds to the longitudinal direction of the blade that is to be made, the fiber blank comprises a first set of a plurality of layers of yarns that are linked together to form a first portion of the blank that corresponds to the preform for the blade airfoil and root, and a second set of a plurality of layers of yarns that are linked together at least locally to form at least one second portion of the blank that corresponds to a preform for an inner or outer blade platform, wherein the yarns of the first set of layers of yarns are not linked to the yarns of the second set of layers of yarns and wherein yarns of the second set of layers of yarns cross through the first set of layers of yarns at the level of the or each second portion of the blank.

2. A method according to claim 1, wherein the fiber blank is woven with a second continuous set of layers of yarns and the shaping of the fiber blank comprises eliminating portions of the second set of layers of yarns external to the or each second portion of the fiber blank by cutting them away.

3. A method according to claim 1, wherein, at the location or at least at one of the locations where yarns of the second set of layers of yarns cross through the first set of layers of yarns, the intersection between a layer of yarns of the first set and a layer of yarns of the second set follows a line that is not orthogonal to the longitudinal direction of the fiber blank.

4. A method according to claim 1, wherein, in the first portion of the fiber blank and in a direction that corresponds to the direction extending along the profile of an airfoil of varying thickness in the blade that is to be made, the number of layers of yarns in the first set of layers of yarns is constant.

5. A method according to claim 4, wherein the yarns of the first set of layers of yarns are of varying weights.

6. A method according to claim 4, wherein the yarns of the first set of layers of yarns are of varying counts.

7. A method according to claim 1, wherein a strip comprising a succession of fiber blanks is made by three-dimensional weaving.

8. A method according to claim 1, wherein the blanks are woven with their longitudinal direction that corresponds to the direction of the blades that are to be made extending in the weft direction.

9. A method according to claim 1, wherein the blanks are woven with their longitudinal direction that corresponds to the direction of the blades that are to be made extending in the warp direction.

10. A turbomachine fitted with a blade fabricated by implementing the method of claim 1.

11. A turbomachine blade made of composite material comprising fiber reinforcement obtained by three-dimensional weaving of yarns and densified by a matrix, wherein the blade comprises a first portion constituting the blade airfoil and root formed as a single part together with at least one second portion constituting an inner or outer blade platform, and the two portions of the fiber reinforcement that corresponds to the first and second portions of the blade are mutually interlaced at least in part, with yarns of the first portion of the fiber reinforcement penetrating into the second portion of the fiber reinforcement.

12. A blade according to claim 11, made of ceramic matrix composite material.

13. A blade according to claim 11, wherein the yarns constitutive of the portion of the fiber reinforcement that corresponds to the second portion of the blade cross through the portion of the fiber reinforcement that corresponds to the first portion of the blade.

14. A blade according to claim 11, wherein the airfoil of the blade has a profile of varying thickness, along which the portion of the fiber reinforcement that corresponds to the first portion of the blade has a constant number of layers of yarns extending in the longitudinal direction of the blade and having varying weights and/or counts.

15. A blade according to claim 11, wherein the airfoil of the blade has a profile of varying thickness, along which the portion of the fiber reinforcement that corresponds to the first portion of the blade has a varying number of layers of yarns extending in the longitudinal direction of the blade.

16. A turbomachine fitted with a blade according to claim 11.

* * * * *